United States Patent
Lee et al.

(10) Patent No.: US 10,390,385 B2
(45) Date of Patent: Aug. 20, 2019

(54) METHOD AND APPARATUS FOR HANDLING SECONDARY CELL DEACTIVATION TIMER IN WIRELESS COMMUNICATION SYSTEM

(71) Applicant: LG ELECTRONICS INC., Seoul (KR)

(72) Inventors: Youngdae Lee, Seoul (KR); Sunghoon Jung, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 68 days.

(21) Appl. No.: 15/306,446

(22) PCT Filed: Apr. 29, 2015

(86) PCT No.: PCT/KR2015/004359
§ 371 (c)(1),
(2) Date: Oct. 24, 2016

(87) PCT Pub. No.: WO2015/167266
PCT Pub. Date: Nov. 5, 2015

(65) Prior Publication Data
US 2017/0054568 A1    Feb. 23, 2017

Related U.S. Application Data

(60) Provisional application No. 61/985,477, filed on Apr. 29, 2014, provisional application No. 61/985,479, filed on Apr. 29, 2014.

(51) Int. Cl.
*H04W 76/38* (2018.01)
*H04W 16/32* (2009.01)
(Continued)

(52) U.S. Cl.
CPC .......... *H04W 76/38* (2018.02); *H04L 12/189* (2013.01); *H04W 16/24* (2013.01); *H04W 16/32* (2013.01);
(Continued)

(58) Field of Classification Search
CPC ..... H04W 76/38; H04W 16/24; H04W 16/32; H04W 60/06; H04W 56/00; H04W 88/02; H04L 12/189
See application file for complete search history.

(56) References Cited

U.S. PATENT DOCUMENTS

2011/0243106 A1* 10/2011 Hsu .................. H04L 5/0096
                                                    370/336
2012/0082107 A1    4/2012 Ou et al.
(Continued)

FOREIGN PATENT DOCUMENTS

CN    102958045    3/2013
EP    2741549    6/2014
(Continued)

OTHER PUBLICATIONS

Qualcomm Incorporated, "Further Discussion on eMBMS reception on configurable SCell", 3GPP TSG-RAN WG2 Meeting #85bis, R2-141651, Mar. 22, 2014, 8 pages.
(Continued)

*Primary Examiner* — Joshua Kading
(74) *Attorney, Agent, or Firm* — Lee, Hong, Degerman, Kang & Waimey (57) ABSTRACT

A method and apparatus for handling a secondary cell (SCell) deactivation timer in a wireless communication system is provided. When a user equipment (UE) is receiving a specific channel or service on a SCell from a network, the UE may start or restart a SCell deactivation timer whenever the SCell deactivation timer expires. Alterna-
(Continued)

tively, the UE may delay expiry of a SCell deactivation timer whenever the SCell deactivation timer expires.

2 Claims, 8 Drawing Sheets

(51) Int. Cl.
*H04L 12/18* (2006.01)
*H04W 60/06* (2009.01)
*H04W 16/24* (2009.01)
*H04W 56/00* (2009.01)
*H04W 88/02* (2009.01)

(52) U.S. Cl.
CPC ........... *H04W 56/00* (2013.01); *H04W 60/06* (2013.01); *H04W 88/02* (2013.01)

(56) References Cited

U.S. PATENT DOCUMENTS

| 2012/0300715 | A1* | 11/2012 | Pelletier | H04W 56/0005 370/329 |
| 2013/0039294 | A1* | 2/2013 | Wang | H04W 74/04 370/329 |
| 2013/0044668 | A1* | 2/2013 | Purnadi | H04W 36/0055 370/312 |
| 2013/0272235 | A1 | 10/2013 | Tseng | |
| 2015/0103724 | A1* | 4/2015 | Xu | H04W 4/06 370/312 |
| 2016/0073407 | A1* | 3/2016 | Nagata | H04W 76/10 370/280 |

FOREIGN PATENT DOCUMENTS

| TW | 201412169 | 3/2014 |
| WO | 2013029552 | 3/2013 |

OTHER PUBLICATIONS

Catt, "Issues on UE Autonomous Configuration of MBMS Frequency", 3GPP TSG RAN WG2 Meeting #85bis, R2-141540, Mar. 21, 2014, 3 pages.
Intel Corporation, "MBMS reception on configurable SCell", 3GPP TSG RAN WG2 Meeting #85bis, R2-141173, Mar. 21, 2014, 4 pages.
3rd Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300 V12.1.0, Mar. 2014, 209 pages.
3rd Generation Partnership Project, "Technical Specification Group Radio Access Network; Evolved Universal Terrestrial Radio Access (E-UTRA); Medium Access Control (MAC) protocol specification (Release 12)", 3GPP TS 36.321 V12.1.0, Mar. 2014, 57 pages.
Catt, "Clarification on the HARQ feedback for SCell activation/deactivation command MAC CE," 3GPP TSG-RAN2 #84, R2-133794, Nov. 15, 2013, 3 pages.
European Patent Office Application Serial No. 15786522.1, Search Report dated Oct. 20, 2017, 8 pages.
The State Intellectual Property Office of the People's Republic of China Application Serial No. 201580022965.3, Office Action dated Jun. 4, 2018, 6 pages.

* cited by examiner

METHOD AND APPARATUS FOR HANDLING SECONDARY CELL DEACTIVATION TIMER IN WIRELESS COMMUNICATION SYSTEM

CROSS-REFERENCE TO RELATED APPLICATIONS

This application is the National Stage filing under 35 U.S.C. 371 of International Application No. PCT/KR2015/004359, filed on Apr. 29, 2015, which claims the benefit of U.S. Provisional Applications Nos. 61/985,477, filed on Apr. 29, 2014 and 61/985,479, filed on Apr. 29, 2014, the contents of which are all hereby incorporated by reference herein in their entirety.

BACKGROUND OF THE INVENTION

Field of the Invention

The present invention relates to wireless communications, and more particularly, to a method and apparatus for handling a secondary cell (SCell) deactivation timer in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

The 3GPP LTE may provide a multimedia broadcast multicast service (MBMS) service. The MBMS is a service which simultaneously transmits data packets to multiple users. If a specific level of users exists in the same cell, the respective users can be allowed to share necessary resources so that the plurality of users can receive the same multimedia data, thereby increasing resource efficiency. In addition, a multimedia service can be used with a low cost from the perspective of users.

The 3GPP LTE may configure carrier aggregation (CA). In CA, two or more component carriers (CCs) are aggregated in order to support wider transmission bandwidths up to 100 MHz. A user equipment (UE) may simultaneously receive or transmit on one or multiple CCs depending on its capabilities. In CA, one primary cell (PCell) and at least one secondary cell (SCell) may be configured.

If the UE is configured with one or more SCells, the network may activate and deactivate the configured SCells. The PCell is always activated. For activation/deactivation of the SCell, a SCell deactivation timer may be used. For a specific channel/service, a method for handling the SCell deactivation timer efficiently may be required.

SUMMARY OF THE INVENTION

The present invention provides a method and apparatus for handling a secondary cell (SCell) deactivation timer in a wireless communication system. The present invention provides a method for starting or restarting a SCell deactivation timer or delaying expiry of the SCell deactivation timer, when the SCell deactivation timer expires.

In an aspect, a method for handling, by a user equipment (UE), a secondary cell (SCell) deactivation timer in a wireless communication system is provided. The method includes receiving, by the UE, a specific channel or service on a SCell from a network, and starting or restarting, by the UE, a SCell deactivation timer whenever the SCell deactivation timer expires.

In another aspect, a method for handling, by a user equipment (UE), a secondary cell (SCell) deactivation timer in a wireless communication system is provided. The method includes receiving, by the UE, a specific channel or service on a SCell from a network, and delaying, by the UE, expiry of a SCell deactivation timer whenever the SCell deactivation timer expires.

Expiry of a SCell deactivation timer may be avoided.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
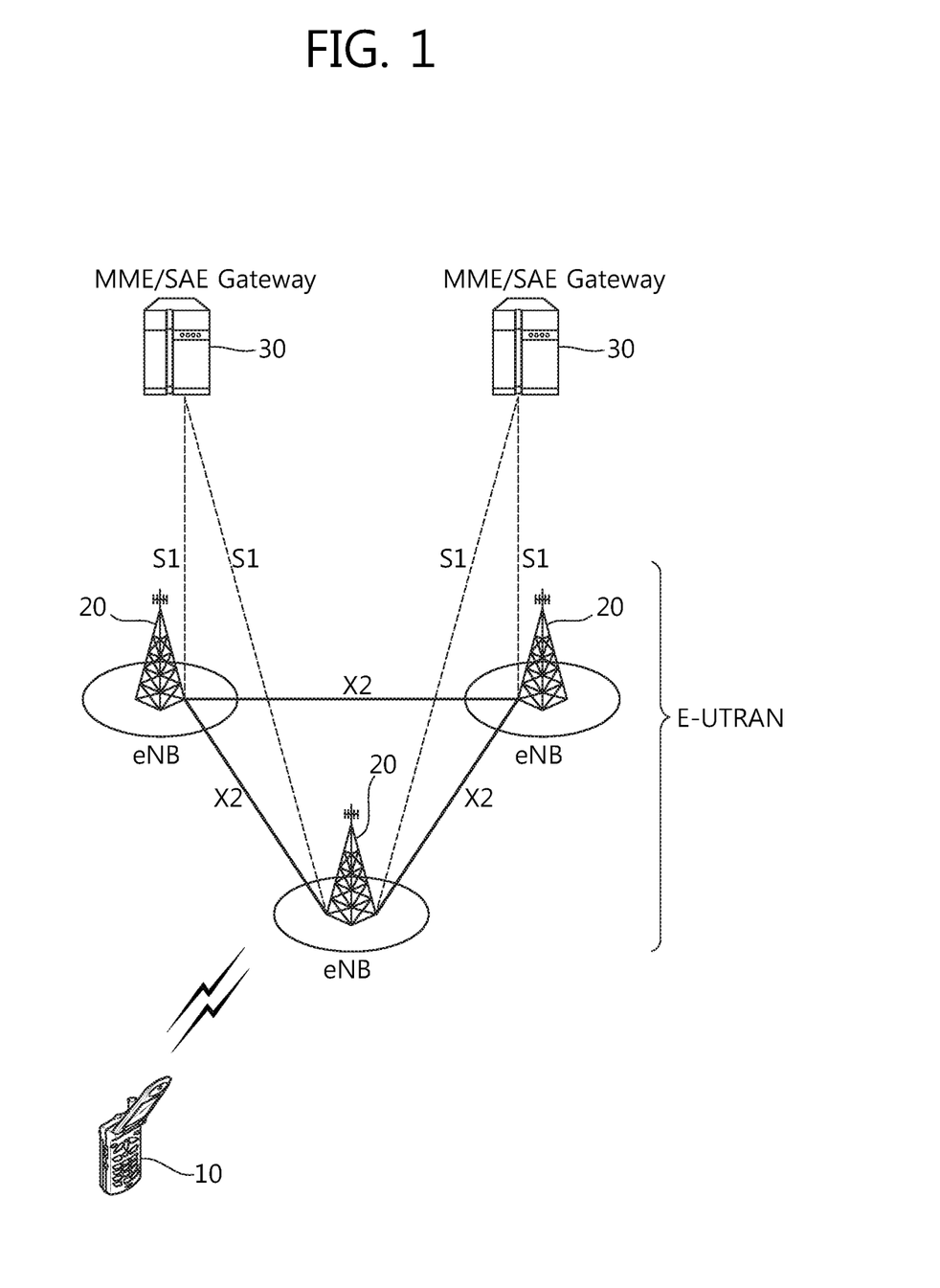
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
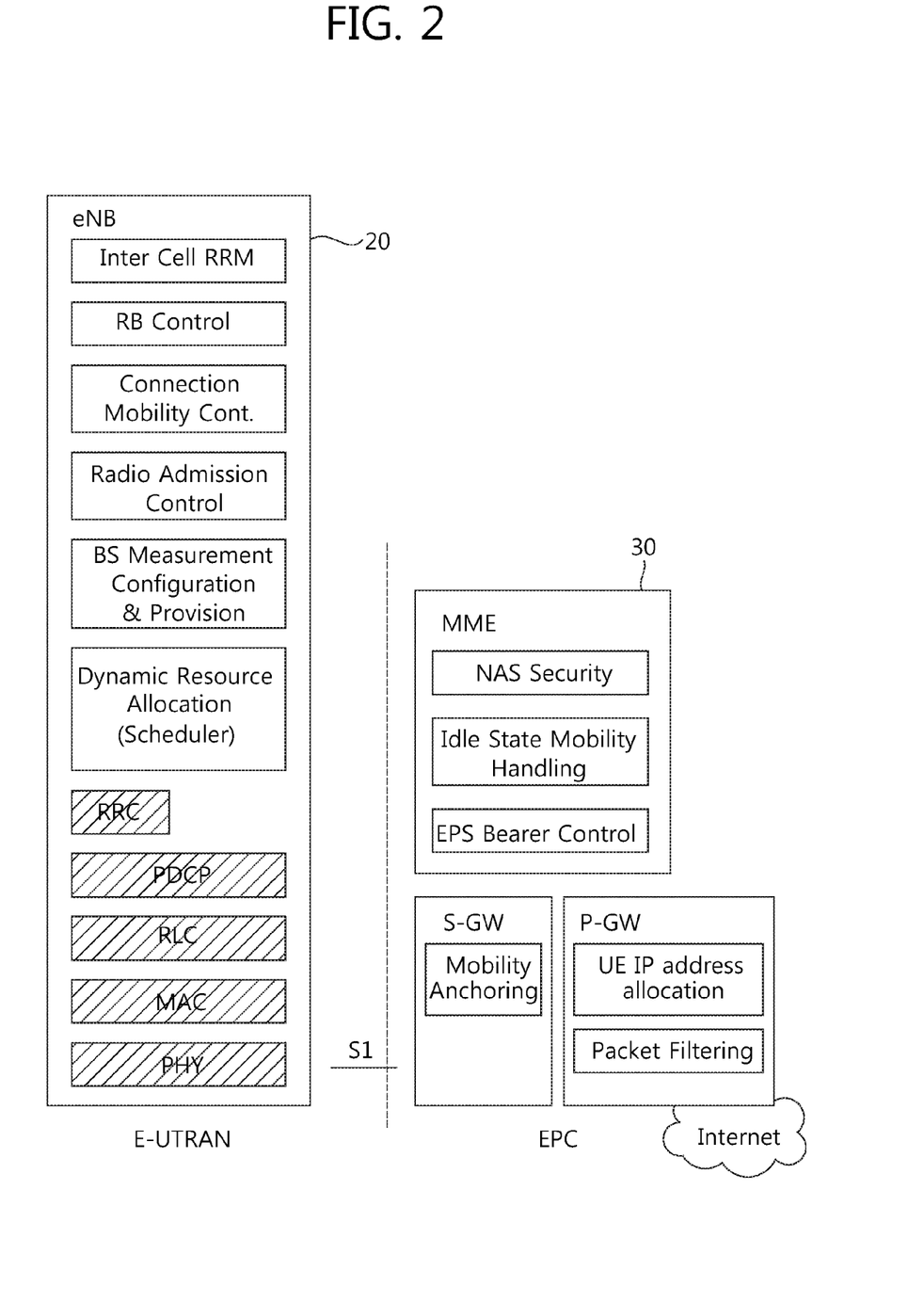
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
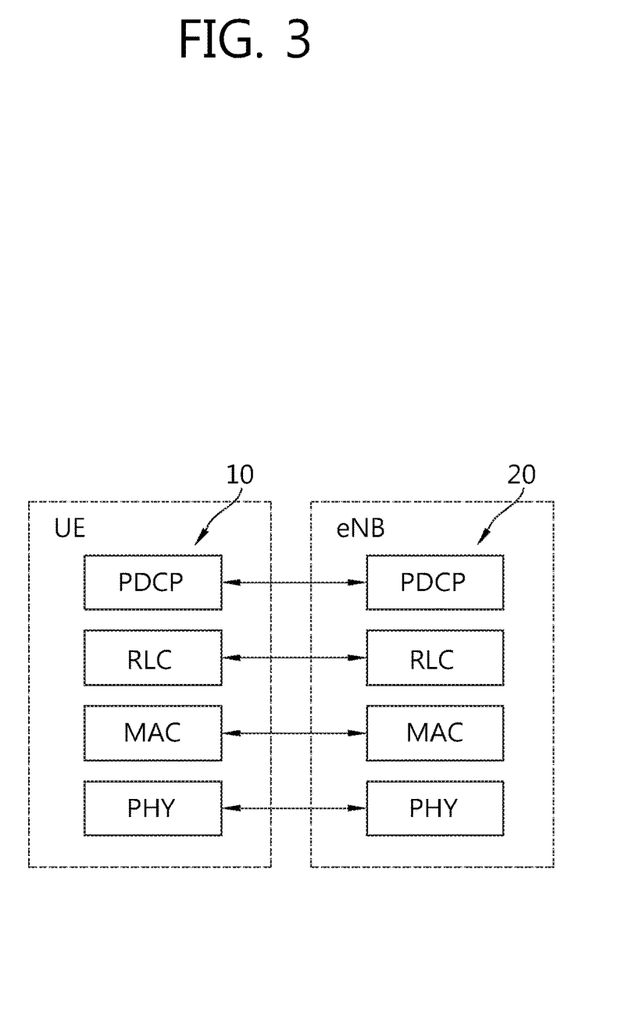
FIG. 3 shows a block diagram of a user plane protocol stack of an LTE system.
Figure 4:
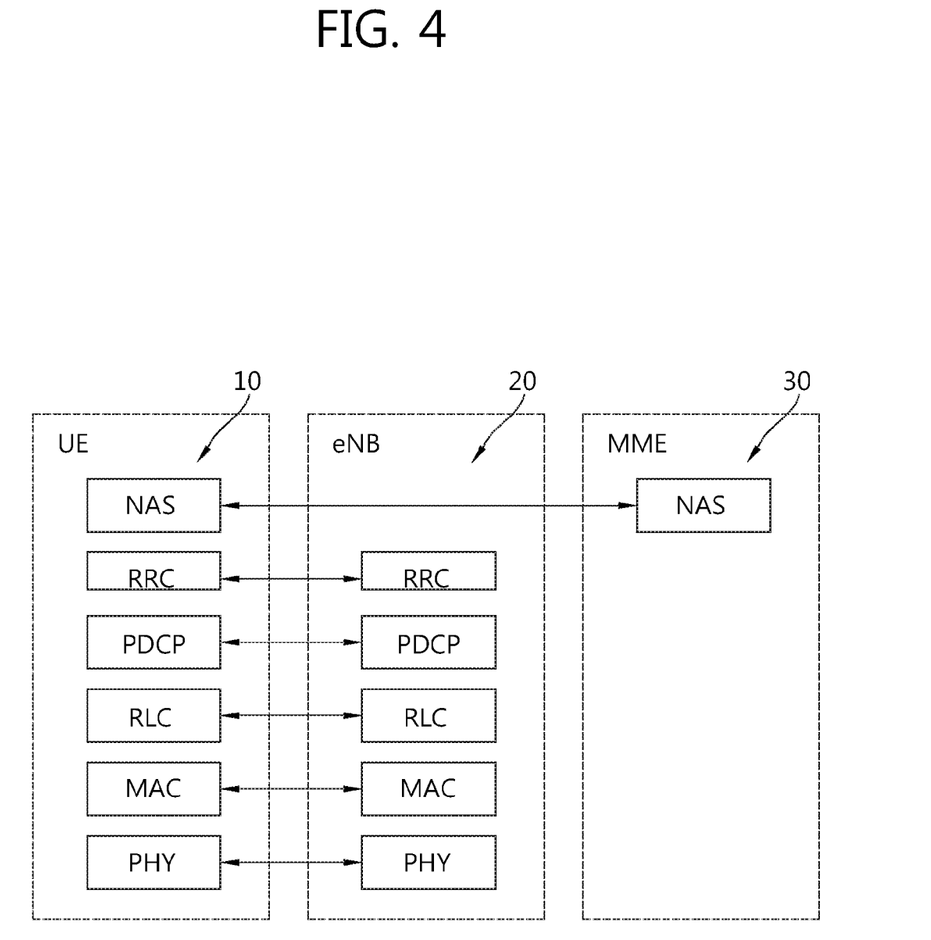
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e. between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
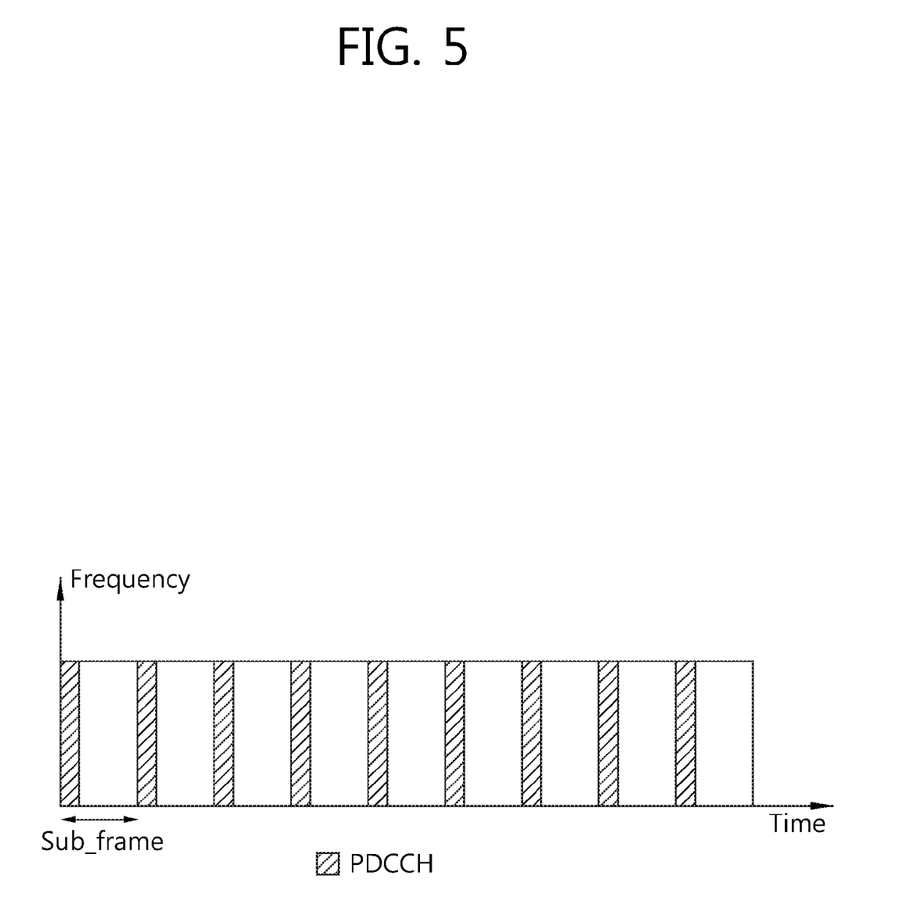
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a DL channel for broadcasting system control information. The PCCH is a DL channel that transfers paging information and is used when the network does not know the location cell of a UE. The CCCH is used by UEs having no RRC connection with the network. The MCCH is a point-to-multipoint DL channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both UL and DL. The MTCH is a point-to-multipoint DL channel for transmitting traffic data from the network to the UE.

UL connections between logical channels and transport channels include the DCCH that can be mapped to the UL-SCH, the DTCH that can be mapped to the UL-SCH and the CCCH that can be mapped to the UL-SCH. DL connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change in order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Carrier aggregation (CA) is described. It may be referred to Section 5.5 and 7.5 of 3GPP TS 36.300 V12.1.0 (2014-03). A UE with single timing advance (TA) capability for CA can simultaneously receive and/or transmit on multiple CCs corresponding to multiple serving cells sharing the same TA (multiple serving cells grouped in one timing advance group (TAG)). A UE with multiple TA capability for CA can simultaneously receive and/or transmit on multiple CCs corresponding to multiple serving cells with different TAs (multiple serving cells grouped in multiple TAGs). E-UTRAN ensures that each TAG contains at least one serving cell. A non-CA capable UE can receive on a single CC and transmit on a single CC corresponding to one serving cell only (one serving cell in one TAG). The CA is supported for both contiguous and non-contiguous CCs with each CC limited to a maximum of 110 resource blocks in the frequency domain.

It is possible to configure a UE to aggregate a different number of CCs originating from the same eNB and of possibly different bandwidths in the UL and the DL. The number of DL CCs that can be configured depends on the DL aggregation capability of the UE. The number of UL CCs that can be configured depends on the UL aggregation capability of the UE. It is not possible to configure a UE with more UL CCs than DL CCs. In typical time division duplex (TDD) deployments, the number of CCs and the bandwidth of each CC in UL and DL is the same. The number of TAGs that can be configured depends on the TAG capability of the UE. CCs originating from the same eNB need not to provide the same coverage.

When CA is configured, the UE only has one RRC connection with the network. At RRC connection establishment/re-establishment/handover, one serving cell provides the NAS mobility information (e.g. tracking area identity (TAD), and at RRC connection re-establishment/handover, one serving cell provides the security input. This cell is referred to as the primary cell (PCell). In the DL, the carrier corresponding to the PCell is the DL primary CC (DL PCC), while in the UL, it is the UL primary CC (UL PCC).

Depending on UE capabilities, secondary cells (SCells) can be configured to form, together with the PCell, a set of serving cells. In the DL, the carrier corresponding to a SCell is a DL secondary CC (DL SCC), while in the UL, it is an UL secondary CC (UL SCC).

Therefore, the configured set of serving cells for a UE always consists of one PCell and one or more SCells. For each SCell, the usage of UL resources by the UE in addition to the DL resources is configurable (the number of DL SCCs configured is therefore always larger than or equal to the number of UL SCCs and no SCell can be configured for usage of UL resources only). From a UE viewpoint, each UL resource only belongs to one serving cell. The number of serving cells that can be configured depends on the aggregation capability of the UE. PCell can only be changed with handover procedure (i.e. with security key change and RACH procedure). PCell is used for transmission of PUCCH. Unlike SCells, PCell cannot be de-activated. Re-establishment is triggered when PCell experiences radio link failure (RLF), not when SCells experience RLF. NAS information is taken from PCell.

The reconfiguration, addition and removal of SCells can be performed by RRC. At intra-LTE handover, RRC can also add, remove, or reconfigure SCells for usage with the target PCell. When adding a new SCell, dedicated RRC signaling is used for sending all required system information of the SCell, i.e. while in connected mode, UEs need not acquire broadcasted system information directly from the SCells.

Activation/deactivation of SCells is described. It may be referred to Section 5.13 of 3GPP TS 36.321 V12.1.0 (2014-03). The network activates and deactivates the SCell(s) by sending the activation/deactivation MAC control element (CE). Furthermore, the UE maintains a sCellDeactivation-Timer timer per configured SCell and deactivates the associated SCell upon its expiry. The same initial timer value applies to each instance of the sCellDeactivationTimer and it is configured by RRC. The configured SCells are initially deactivated upon addition and after a handover.

The UE shall for each TTI and for each configured SCell:
1> if the UE receives an activation/deactivation MAC CE in this TTI activating the SCell, the UE shall in the TTI:
2> activate the SCell; i.e. apply normal SCell operation including sounding reference signal (SRS) transmissions on the SCell, channel quality indicator (CQI)/precoding matrix indicator (PMI)/rank indicator (RD/precoding type indicator (PTI) reporting for the SCell, PDCCH monitoring on the SCell, and/or PDCCH monitoring for the SCell.
2> start or restart the sCellDeactivationTimer associated with the SCell;
2> trigger power headroom report (PHR).
1> else, if the UE receives an activation/deactivation MAC CE in this TTI deactivating the SCell; or
1> if the sCellDeactivationTimer associated with the activated SCell expires in this TTI:
2> deactivate the SCell;
2> stop the sCellDeactivationTimer associated with the SCell;
2> flush all HARQ buffers associated with the SCell.

1> if PDCCH on the activated SCell indicates an UL grant or DL assignment; or
1> if PDCCH on the serving cell scheduling the activated SCell indicates an UL grant or a DL assignment for the activated SCell:
2> restart the sCellDeactivationTimer associated with the SCell;
1> if the SCell is deactivated:
2> not transmit SRS on the SCell;
2> not report CQI/PMI/RI/PTI for the SCell;
2> not transmit on UL-SCH on the SCell;
2> not transmit on RACH on the SCell;
2> not monitor the PDCCH on the SCell;
2> not monitor the PDCCH for the SCell.

HARQ feedback for the MAC PDU containing activation/deactivation MAC CE shall not be impacted by PCell interruption due to SCell activation/deactivation. When SCell is deactivated, the ongoing random access procedure on the SCell, if any, is aborted.

Multimedia broadcast multicast services (MBMS) is described. It may be referred to Section 15 of 3GPP TS 36.300 V12.1.0 (2014-03). For the MBMS, following definitions are introduced.

Multicast-broadcast single frequency network (MBSFN) synchronization area: An area of the network where all eNBs can be synchronized and perform MBSFN transmissions. MBSFN synchronization areas are capable of supporting one or more MBSFN areas. On a given frequency layer, an eNB can only belong to one MBSFN synchronization area. MBSFN synchronization areas are independent from the definition of MBMS service areas.

MBSFN transmission or a transmission in MBSFN mode: A simulcast transmission technique realized by transmission of identical waveforms at the same time from multiple cells. An MBSFN transmission from multiple cells within the MBSFN area is seen as a single transmission by a UE.

MBSFN area: An MBSFN area consists of a group of cells within an MBSFN synchronization area of a network, which are coordinated to achieve an MBSFN transmission. Except for the MBSFN area reserved cells, all cells within an MBSFN area contribute to the MBSFN transmission and advertise its availability. The UE may only need to consider a subset of the MBSFN areas that are configured, i.e. when it knows which MBSFN area applies for the service(s) it is interested to receive.

MBSFN area reserved cell: A cell within a MBSFN area which does not contribute to the MBSFN transmission. The cell may be allowed to transmit for other services but at restricted power on the resource allocated for the MBSFN transmission.

Synchronization sequence: Each SYNC protocol data unit (PDU) contains a time stamp which indicates the start time of the synchronization sequence. For an MBMS service, each synchronization sequence has the same duration which is configured in the broadcast and multicast service center (BM-SC) and the multi-cell/multicast coordination entity (MCE).

Synchronization Period: The synchronization period provides the time reference for the indication of the start time of each synchronization sequence. The time stamp which is provided in each SYNC PDU is a relative value which refers to the start time of the synchronization period. The duration of the synchronization period is configurable.

In RRC_CONNECTED, the UE that is receiving or interested to receive MBMS via MBSFN informs the network about its MBMS interest via a RRC message and the network does its best to ensure that the UE is able to receive MBMS and unicast services subject to the UE's capabilities. The UE indicates the frequencies which provide the service(s) that the UE is receiving or is interested to receive simultaneously, and which can be received simultaneously in accordance with the UE capabilities. The UE indicates its MBMS interest at RRC connection establishment (the UE does not need to wait until AS security is activated), and whenever the set of frequencies on which the UE is interested in receiving MBMS services has changed compared with the last indication sent to the network (e.g. due to a change of user interest or of service availability). The UE may only indicate its interest when the PCell provides SystemInformationBlockType15 and after having acquired SystemInformationBlockType15 of the current PCell. The UE may indicate its MBMS interest even if the current configured serving cell(s) do not prevent it from receiving the MBMS services it is interested in. The UE indicates with a single bit whether it prioritizes MBMS reception over unicast. This priority indication applies to all unicast bearers and all MBMS frequencies. It is sent whether the MBMS frequencies are congested or not.

The E-UTRAN reuses the SupportedBandCombination information element (IE) to derive the UEs MBMS related reception capabilities, i.e. the E-UTRAN tries to ensure that the UE is able to receive MBMS and unicast bearers by providing them on the frequencies indicated in SupportedBandCombination IE signalled by the UE. The UE shall support MBMS reception on any serving cell and on any cell that may be additionally configured as serving cell according to the UE capabilities for unicast reception. For handover preparation, the source eNB transfers the MBMS interest of the UE, if available, to the target eNB. After handover, the UE reads SystemInformationBlockType15 before updating its MBMS interest. If SystemInformationBlockType15 is provided on the target cell but not on the source cell, the UE indicates its MBMS interest after handover.

In 3GPP rel-11, a UE indicating interest in MBMS may support MBMS reception on the indicated frequencies according to supportedBandCombination, no matter whether the frequency is configured as SCell or not. When SCell is not configured for that indicated frequency, it is called MBMS reception on "configurable SCell".

If the UE transmits an MBMSInterestIndication message including a MBMS frequency where interested MBMS service is scheduled/transmitted, the eNB may transmit an RRCConnectionReconfiguration message to the UE for addition of a SCell on the MBMS frequency. Upon receiving the RRCConnectionReconfiguration message for addition of the SCell, the UE which is capable of receiving MBMS on the SCell configured by the eNB may reconfigure UE's receiver bandwidth, in order to cover both the frequency of the PCell and the MBMS frequency of the SCell. Afterwards, upon receiving the RRCConnectionReconfiguration message for removal of the SCell, the UE may reconfigure UE's receiver bandwidth, in order to cover the frequency of the PCell only.

Meanwhile, when the UE attempts to receive MBMS on a non-serving cell, how to minimize the impact of radio frequency (RF) retuning and glitch. Currently, whether the glitch due to RF retuning for the MBMS reception on configurable SCell is allowed or not is not specified. From the UE point of view, the same form of RF tuning is necessary for the regular SCell addition and the UE autonomous addition of configurable SCell. Further, it is also not clear currently when the UE should perform the UE autonomous SCell addition with respect to the timing of MBMS interest indication. For example, the UE may want to wait for the eNB to take an action, e.g. SCell addition, to accommodate the UE's preference in the MBMS interest indication before going ahead with the UE autonomous SCell addition.

If the SCell is added, the eNB may activate or deactivate the SCell, depending on unicast traffic for the UE. If the UE is not receiving the MBMS on the SCell, the UE can reduce UE's receiver bandwidth upon deactivation in order to save UE battery power. However, if the UE is receiving MBMS on the SCell, activation/deactivation cannot lead to UE battery power saving, because the UE receiving MBMS on the SCell cannot reduce UE's receiver bandwidth due to the glitch which cause packet drops. Accordingly, the SCell on which the MBMS is received cannot be deactivated, but needs to be activated continuously.

In order to solve the problem described above, hereinafter, a method for handling SCell deactivation timer according to an embodiment of the present invention is described.

Figure 6:
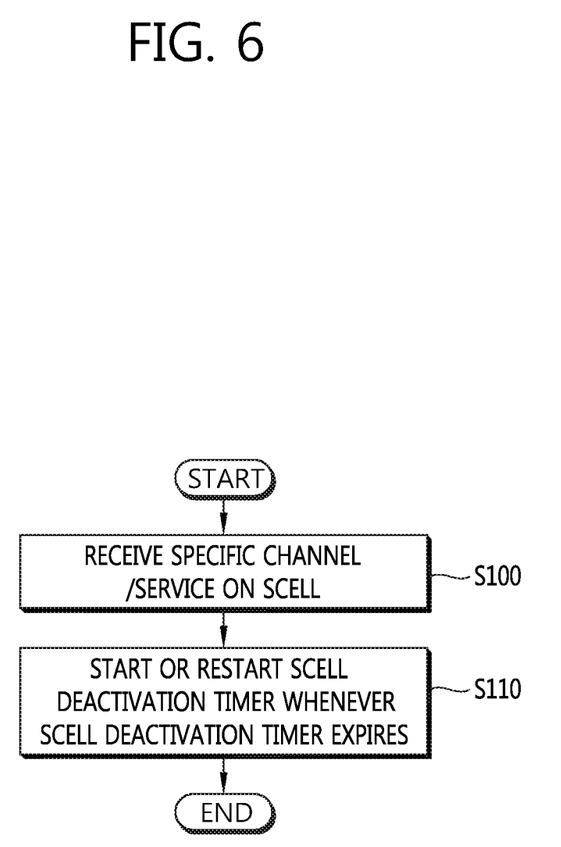
FIG. 6 shows an example of a method for handling a SCell deactivation timer according to an embodiment of the present invention.

FIG. 6 shows an example of a method for handling a SCell deactivation timer according to an embodiment of the present invention. In step S100, the UE is receiving a specific channel/service on the frequency of the SCell. The specific channel/service may be MBMS related channel/service. The specific channel/service may be device-to-device (D2D) related channel/service. D2D may include D2D transmission/reception, or D2D communication/discovery. The specific channel/service may be vehicle-to-everything (V2X) related channel/service. V2X may include vehicle-to-vehicle (V2V), vehicle-to-pedestrians (V2P), or vehicle-to-infrastructure (V2I). In step S110, the UE starts or restarts the sCellDeactivationTimer associated with the SCell at the TTI, whenever the sCellDeactivationTimer expires in the TTI.

Figure 7:
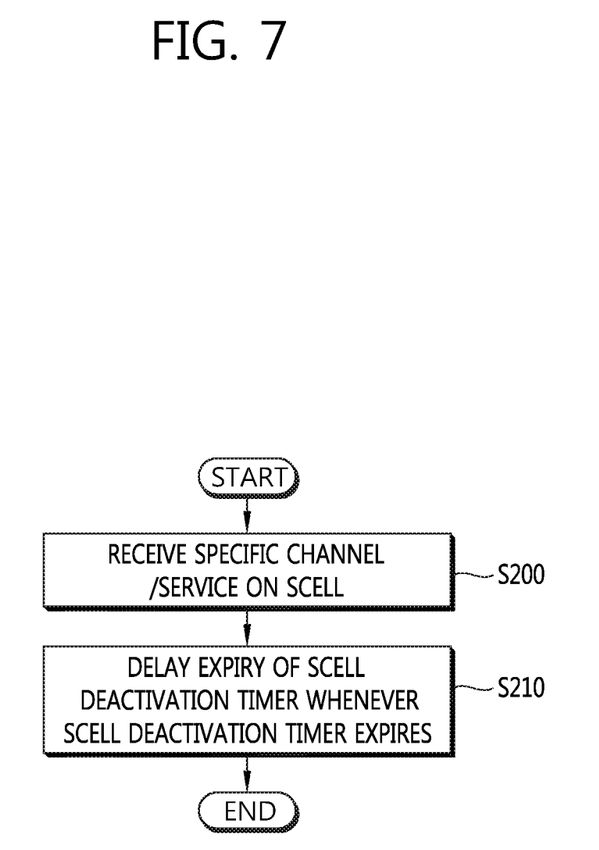
FIG. 7 shows another example of a method for handling a SCell deactivation timer according to an embodiment of the present invention.

FIG. 7 shows another example of a method for handling a SCell deactivation timer according to an embodiment of the present invention. In step S200, the UE is receiving a specific channel/service on the frequency of the SCell. The specific channel/service may be MBMS related channel/service. The specific channel/service may be D2D related channel/service. D2D may include D2D transmission/reception, or D2D communication/discovery. The specific channel/service may be V2X related channel/service. V2X may include V2V, V2P, or V2I. In step S210, the UE delays expiry of the sCellDeactivationTimer associated with the SCell at the TTI by one or N TTIs, whenever the sCellDeactivationTimer expires in the TTI. In this case, N may be an integer and N>1.

Alternatively, when the UE is receiving the specific channel/service on the frequency of the SCell, the UE may not maintain the sCellDeactivationTimer associated with the SCell.

Hereinafter, it is assumed that the specific channel/service corresponds to MBMS related channel/service, but the present invention is not limited thereto.

According to an embodiment of the present invention, the sCellDeactivationTimer may be handled for the activated SCell of the MBMS frequency as follows.

The UE shall for each TTI and for each configured SCell:
1> if the UE receives an activation/deactivation MAC CE in this TTI activating the SCell, the UE shall in the TTI:
2> activate the SCell; i.e. apply normal SCell operation including SRS transmissions on the SCell, CQI/PMFRUPTI reporting for the SCell, PDCCH monitoring on the SCell, and/or PDCCH monitoring for the SCell.
2> start or restart the sCellDeactivationTimer associated with the SCell;
2> trigger PHR.
1> else, if the UE receives an activation/deactivation MAC CE in this TTI deactivating the SCell; or
1> if the sCellDeactivationTimer associated with the activated SCell expires in this TTI:
2> deactivate the SCell;
2> stop the sCellDeactivationTimer associated with the SCell;
2> flush all HARQ buffers associated with the SCell.
1> if PDCCH on the activated SCell indicates an UL grant or DL assignment; or
1> if PDCCH on the serving cell scheduling the activated SCell indicates an UL grant or a DL assignment for the activated SCell; or
1> if the transmission of an MCH on the (activated) SCell occurs in this TTI; or
1> if MCCH, MCH scheduling information (MSI) or MTCH on the (activated) SCell is received in this TTI; or
1> if MSI on the (activated) SCell indicates that MTCH is transmitted in this TTI; or
1> if system information on the (activated) SCell indicates that MCCH or MSI is transmitted in this TTI:
2> restart the sCellDeactivationTimer associated with the SCell; or
2> delay expiry of the sCellDeactivationTimer associated with the SCell by one or N TTI (N>1);
1> if the SCell is deactivated:
2> not transmit SRS on the SCell;
2> not report CQI/PMFRUPTI for the SCell;
2> not transmit on UL-SCH on the SCell;
2> not transmit on RACH on the SCell;
2> not monitor the PDCCH on the SCell;
2> not monitor the PDCCH for the SCell.

HARQ feedback for the MAC PDU containing activation/deactivation MAC CE shall not be impacted by PCell interruption due to SCell activation/deactivation.

When SCell is deactivated, the ongoing random access procedure on the SCell, if any, is aborted.

Alternatively, if the UE is receiving MCH on the configured SCell, the UE does not maintain a sCellDeactivationTimer timer for the configured SCell.

According to another embodiment of the present invention, UE autonomous SCell activation/deactivation may be performed on MBMS reception (with a signal timer or separate timers) as follows.

If the UE is receiving MCH on a configured SCell or a non-serving cell (i.e. configurable SCell), the UE maintains sCellDeactivationTimer timer for a configured SCell or a configurable SCell. Alternatively, the UE maintains sCellDeactivationTimer timer for a configured SCell and mBMSsCellDeactivationTimer timer for a configurable SCell. In case that the UE transmits a MBMSInterestIndication indicating a frequency of the SCell, the eNB assumes that when MCH is transmitted at a TTI on the frequency of the SCell, the SCell is configured and activated at this TTI in the UE side. If the UE is receiving a MCH on a frequency, the UE autonomously configures a SCell of the frequency. This SCell is called the configurable SCell.

The UE shall for each TTI and for each configured SCell or each configurable SCell:
1> if the UE receives an activation/deactivation MAC CE in this TTI activating the SCell, the UE shall in the TTI:
2> activate the SCell; i.e. apply normal SCell operation including SRS transmissions on the SCell, CQI/PMFRUPTI reporting for the SCell, PDCCH monitoring on the SCell, and/or PDCCH monitoring for the SCell.
2> start or restart the sCellDeactivationTimer associated with the SCell;
2> trigger PHR.
1> if the transmission of MCH occurs either in this TTI or in an upcoming TTI (e.g. in this TTI+8 subframes):
2> activate the SCell; i.e. apply normal SCell operation including SRS transmissions on the SCell, CQI/PMFRUPTI reporting for the SCell, PDCCH monitoring on the SCell, PDCCH monitoring for the SCell.
2> start or restart the sCellDeactivationTimer (or the mBMSsCellDeactivationTimer) associated with the SCell;
2> trigger PHR.
1> else, if the UE receives an activation/deactivation MAC CE in this TTI deactivating the SCell; or
1> if the sCellDeactivationTimer associated with the activated SCell expires in this TTI:
2> deactivate the SCell (if the mBMSsCellDeactivationTimer is not running);
2> stop the sCellDeactivationTimer associated with the SCell;
2> flush all HARQ buffers associated with the SCell (if the mBMSsCellDeactivationTimer is not running).
1> if the mBMSsCellDeactivationTimer associated with the activated SCell expires in this TTI:
2> deactivate the SCell (if the sCellDeactivationTimer is not running);
2> stop the mBMSsCellDeactivationTimer associated with the SCell;
2> flush all HARQ buffers associated with the SCell (if the sCellDeactivationTimer is not running).
1> if PDCCH on the activated SCell indicates an UL grant or DL assignment; or
1> if PDCCH on the serving cell scheduling the activated SCell indicates an UL grant or a DL assignment for the activated SCell:
2> restart the sCellDeactivationTimer (and the mBMSsCellDeactivationTimer) associated with the SCell;
1> if the transmission of an MCH on the (activated) SCell occurs in this TTI; or
1> If MCCH, MSI or MTCH on the (activated) SCell is received in this TTI; or
1> if MSI on the (activated) SCell indicates that MTCH is transmitted in this TTI; or
1> if system information on the (activated) SCell indicates that MCCH or MSI is transmitted in this TTI:
2> restart the mBMSsCellDeactivationTimer (and the sCellDeactivationTimer) associated with the SCell; or
2> delay expiry of the mBMSsCellDeactivationTimer (and the sCellDeactivationTimer) associated with the SCell by one TTI;
1> if the SCell is deactivated:
2> not transmit SRS on the SCell;
2> not report CQI/PMFRUPTI for the SCell;
2> not transmit on UL-SCH on the SCell;
2> not transmit on RACH on the SCell;
2> not monitor the PDCCH on the SCell;
2> not monitor the PDCCH for the SCell.

HARQ feedback for the MAC PDU containing activation/deactivation MAC CE shall not be impacted by PCell interruption due to SCell activation/deactivation.

According to another embodiment of the present invention, the UE receives the MBMS channel on the frequency of the SCell, depending on whether the SCell is activated or deactivated. More specifically, if the SCell is activated and if the UE is capable of receiving MBMS on configured SCell, the UE may receive the MBMS channel on the frequency of the SCell. If the SCell is deactivated, if the UE is capable of receiving MBMS on configured SCell, and if the UE is not capable of receiving MBMS on a non-serving cell, the UE may not receive the MBMS channel on the frequency of the SCell. If the SCell is deactivated, if the UE is capable of receiving MBMS on configured SCell, and if the UE is capable of receiving MBMS on a non-serving cell, the UE may receive the MBMS channel on the frequency of the SCell.

In this case, the eNB may receive the MBMSInterestIndication message indicating a MBMS frequency from the UE. The eNB may transmit the RRCConnectionReconfiguration message adding the SCell to the UE. The eNB may transmit an activation/deactivation MAC CE indicating activation of the SCell to the UE, if a MBMS transmission is scheduled. The eNB may transmit an activation/deactivation MAC CE indicating deactivation of the SCell to the UE, if a MBMS transmission is not scheduled;

Procedures according to an embodiment of the present invention described above is as follows. It is assumed that the UE is capable of receiving MBMS on configured SCell, but the UE is not capable of receiving MBMS on a non-serving cell.

Step 1: The UE establishes a RRC connection on a PCell with the eNB. UE's receiver bandwidth only covers the frequency of the PCell.

Step 2: The UE transmits its UE capability to the network. The UE capability may include whether or not the UE supports MBMS reception on SCell without glitch and MBMS reception on non-serving SCell without glitch. If the UE supports MBMS reception on SCell without glitch and MBMS reception on non-serving SCell without glitch, the UE may be allowed to receive MBMS on SCell or MBMS on non-serving cell any time regardless of activation/deactivation. Further, the UE capability may include whether or not the UE supports MBMS reception on SCell with glitch. If the UE supports MBMS reception on SCell with glitch, the UE may not need to receive MBMS from the subframe of deactivation command reception to N (e.g. 9 for FDD) subframes or from the subframe of activation command reception to M (e.g. 9 for FDD) subframes. Alternatively, if the UE supports MBMS reception on SCell with glitch, interruption on the PCell may be allowed from the subframe of deactivation command reception to N subframes or from the subframe of activation command reception to M subframes. Hereinafter, it is assumed that the UE supports MBMS reception on SCell with glitch.

Step 3: The UE transmits the MBMSInterestIndication message indicating a MBMS frequency to the eNB. If a SCell is not configured on the MBMS frequency, the UE does not receive the MBMS channel on the MBMS frequency.

Step 4: The eNB transmits the RRCConnectionReconfiguration message adding a SCell to the UE. The added SCell is on the MBMS frequency.

Step 5: The UE adds the SCell on the MBMS frequency and deactivates the SCell.

Step 6: If a RRC message on MCCH, a MSI CE, or a MBMS service on MTCH is to be transmitted, the eNB transmits an activation/deactivation MAC CE indicating activation of the SCell to the UE.

Step 7: The UE activates the SCell on the MBMS frequency, and reconfigure receiver bandwidth (i.e. re-tune RF receiver) to cover both the frequency of the PCell and the frequency of the SCell.

Step 8: While the SCell on the MBMS frequency is activated, the UE receives a RRC message on MCCH, a MSI CE, or a MBMS service on MTCH from the activated SCell.

Step 9: If a RRC message on MCCH, a MSI CE, or a MBMS service on MTCH is to be not transmitted, the eNB transmits an activation/deactivation MAC CE indicating deactivation of the SCell to the UE.

Step 10: The UE deactivates the SCell on the MBMS frequency, and reduces receiver bandwidth (i.e. re-tune RF receiver) to cover the frequency of the PCell only.

Step 11: While the SCell on the MBMS frequency is deactivated, the UE does not receive a RRC message on MCCH, a MSI CE, or a MBMS service on MTCH from the deactivated SCell.

Figure 8:
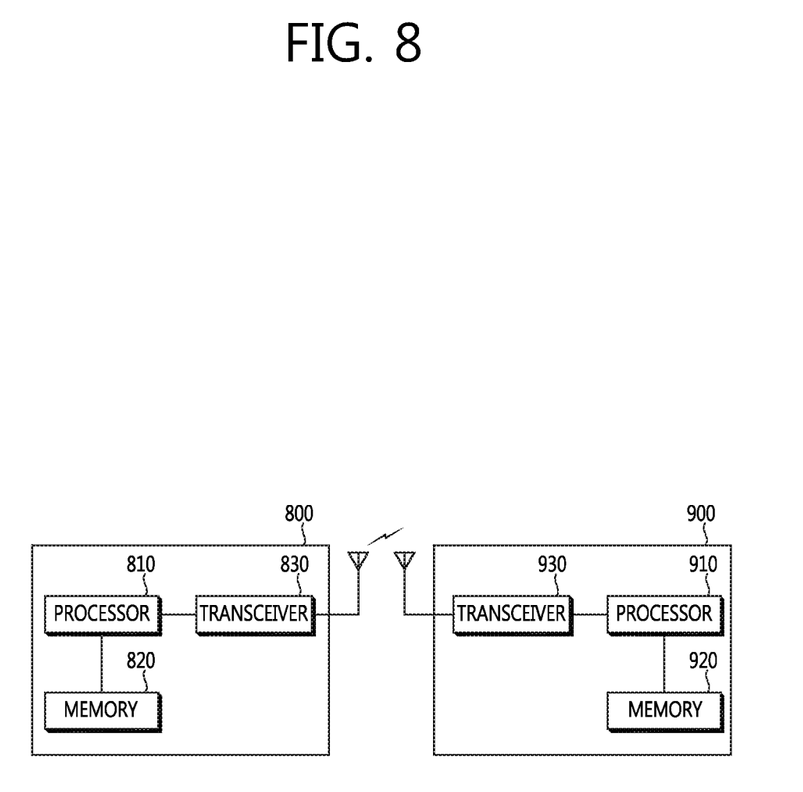
FIG. 8 shows a wireless communication system to implement an embodiment of the present invention.

FIG. 8 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for a user equipment (UE) in a wireless communication system, the method comprising:
    transmitting, by the UE, a message for an interest of a multimedia broadcast multicast services (MBMS) service to a network, wherein the MBMS service is broadcasted via a secondary cell (SCell);
    receiving, by the UE, a radio resource control (RRC) connection reconfiguration message for addition of the SCell from the network;
    activating, by the UE, the SCell on a frequency related to the MBMS service;
    starting, by the UE, a SCell deactivation timer for the SCell;
    receiving, by the UE, the MBMS service via the SCell on the frequency;
    detecting that the SCell deactivation timer expires in a first transmission time interval TTI;
    in response to the SCell deactivation timer expiring in the first TTI occurring while the UE is receiving the MBMS service via the SCell on the frequency in the first TTI, restarting, by the UE, the SCell deactivation timer at a second TTI which is an upcoming TTI of the first TTI; and
    re-activating, by the UE, the SCell upon restart of the SCell deactivation timer.

2. A user equipment (UE) in a wireless communication system, the UE comprising:
    a transceiver for transmitting or receiving a radio signal; and
    a processor coupled to the transceiver, and configured to:
    control the transceiver to transmit a message for an interest of a multimedia broadcast multicast services (MBMS) service to a network, wherein the MBMS service is broadcasted via a secondary cell (SCell);
    control the transceiver to receive a radio resource control (RRC) connection reconfiguration message for addition of the SCell from the network;
    activate the SCell on a frequency related to the MBMS service;
    start a SCell deactivation timer for the SCell;
    control the transceiver to receive the MBMS service via the SCell on the frequency;
    in response to an event for deactivating the SCell occurring while the UE is receiving the MBMS service via the SCell on the frequency in a first transmission time interval (TTI), restart the SCell deactivation timer at a second TTI which is an upcoming TTI of the first TTI; and
    re-activate the Scell upon restart of the SCell activation timer,
    wherein the event for deactivating the SCell is that the SCell deactivation timer expires in the first TTI.

* * * * *